United States Patent
Ganesan et al.

(10) Patent No.: US 9,049,349 B2
(45) Date of Patent: Jun. 2, 2015

(54) SYSTEM AND METHOD FOR VIDEO RECORDING AND RETENTION IN A NETWORK

(75) Inventors: Elango Ganesan, Palo Alto, CA (US);
Michael Freed, Pleasanton, CA (US);
Brian A. Apgar, San Jose, CA (US);
Guido Jouret, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 346 days.

(21) Appl. No.: 13/473,133

(22) Filed: May 16, 2012

(65) Prior Publication Data
US 2013/0307971 A1    Nov. 21, 2013

(51) Int. Cl.
H04N 7/18       (2006.01)
H04N 21/214     (2011.01)
H04N 21/218     (2011.01)

(52) U.S. Cl.
CPC .......... *H04N 7/181* (2013.01); *H04N 21/2143* (2013.01); *H04N 21/21805* (2013.01)

(58) Field of Classification Search
CPC ............ H04N 7/181; H04N 21/21805; H04N 21/214; H04N 21/2143; H04N 7/18; H04N 7/183; H04N 7/188; G06K 9/00771; G06K 9/00; G08B 13/196; G08B 13/19656
USPC ......................................................... 348/143
See application file for complete search history.

(56) References Cited

U.S. PATENT DOCUMENTS

| | | | | |
|---|---|---|---|---|
| 4,254,500 A * | 3/1981 | Brookhart | ................ | 386/204 |
| 5,262,964 A * | 11/1993 | Bonsall et al. | .............. | 709/246 |
| 5,822,537 A * | 10/1998 | Katseff et al. | ............... | 709/231 |
| 5,926,208 A * | 7/1999 | Noonen et al. | .............. | 348/14.13 |
| 6,430,652 B1 * | 8/2002 | Fechser et al. | ............... | 711/111 |
| 6,667,992 B1 * | 12/2003 | Yanagawa | .................. | 370/490 |
| 6,876,705 B2 * | 4/2005 | Katsavounidis et al. | | 375/240.28 |
| 6,965,601 B1 * | 11/2005 | Nakano et al. | ................ | 370/394 |
| 7,304,994 B2 | 12/2007 | Dubnicki et al. | | |
| 7,478,120 B1 | 1/2009 | Zhang | | |
| 8,019,194 B2 * | 9/2011 | Morrison et al. | .............. | 386/239 |
| 8,392,552 B2 * | 3/2013 | Alexander et al. | ............ | 709/224 |
| 8,463,825 B1 * | 6/2013 | Harty et al. | ................... | 707/813 |
| 8,468,304 B1 * | 6/2013 | Corbett | ........................ | 711/114 |
| 8,510,370 B2 * | 8/2013 | Quinn et al. | ................... | 709/203 |
| 8,700,769 B2 * | 4/2014 | Alexander et al. | ............ | 709/224 |
| 2004/0019681 A1 * | 1/2004 | Nakamura et al. | ............ | 709/226 |
| 2005/0091311 A1 * | 4/2005 | Lund et al. | .................... | 709/203 |

(Continued)

OTHER PUBLICATIONS

U.S. Appl. No. 13/023,455, filed Feb. 8, 2011 entitled "Reliable Data Dissemination Over Dynamic Peer-to-Peer Systems," Inventors: Danjue Li, et al.

(Continued)

*Primary Examiner* — Shan Elahi
(74) *Attorney, Agent, or Firm* — Patent Capital Group

(57) ABSTRACT

A method is provided in one example embodiment and includes receiving a video frame from an encoder associated with a first camera that is coupled to a network; appending the video frame to a data block; associating a parity block to the video frame; evaluating whether the data block is full; and communicating the data block to a second camera in the network. In other embodiments, the method can include receiving additional video frames from the encoder; appending the additional video frames to a plurality of data blocks; and aligning particular sizes of the plurality of data blocks to a plurality of corresponding disk write sizes.

19 Claims, 9 Drawing Sheets

(56) References Cited

U.S. PATENT DOCUMENTS

| | | | |
|---|---|---|---|
| 2005/0135381 A1 | 6/2005 | Dubnicki et al. | |
| 2006/0023786 A1* | 2/2006 | Li et al. | 375/240.16 |
| 2006/0274829 A1* | 12/2006 | Siemens et al. | 375/240.01 |
| 2007/0035623 A1* | 2/2007 | Garoutte et al. | 348/143 |
| 2007/0174309 A1 | 7/2007 | Pettovello | |
| 2007/0217501 A1* | 9/2007 | Siemens et al. | 375/240.01 |
| 2007/0248226 A1* | 10/2007 | Chong et al. | 380/200 |
| 2007/0273696 A1 | 11/2007 | Cheng et al. | |
| 2008/0298470 A1* | 12/2008 | Boyce et al. | 375/240.27 |
| 2009/0193314 A1* | 7/2009 | Melliar-Smith et al. | 714/755 |
| 2009/0228511 A1* | 9/2009 | Atkin et al. | 707/102 |
| 2010/0146003 A1 | 6/2010 | Bruso et al. | |
| 2010/0189367 A1* | 7/2010 | van der Merwe et al. | 382/217 |
| 2011/0249086 A1* | 10/2011 | Guo et al. | 348/14.12 |
| 2012/0218416 A1* | 8/2012 | Leny et al. | 348/159 |
| 2012/0294373 A1* | 11/2012 | Mochizuki et al. | 375/240.24 |

OTHER PUBLICATIONS

U.S. Appl. No. 13/281,125, filed Oct. 25, 2011 entitled "Prefix and Predictive Search in a Distributed Hash Table," Inventors: Steven V. Luong, et al.

U.S. Appl. No. 13/417,827, filed Mar. 12, 2012 entitled "System and Method for Distributing Content in a Video Surveillance Network," Inventors: Paul Quinn, et al.

Emil Sit, et al., "A DHT-based Backup System," 2003, 5 pages; http://doc.cat-v.org/plan_9/misc/venti-dhash/sit.pdf.

Marcel Karnstedt, et al., "UniStore: Querying a DHT-based Universal Storage," Technical report LSIR-Report-2006-011, 4 pages; http://www.manfredhauswirth.org/research/papers/LSIR-REPORT-2006-011.pdf.

USPTO Oct. 13, 2013 Non-Final Office Action from U.S. Appl. No. 13/281,125.

USPTO Apr. 9, 2014 Final Office Action from U.S. Appl. No. 13/281,125.

Honovich, John, "Video Surveillance as a Service (VSaaS) Comparison 2010," IP Video Market Info—The Source for Video Surveillance, Jul. 21, 2011, 7 pages http://ipvm.com/report/hosted_managed_video_surveillance_comparison_.

Joung, et al., "KISS: a Simple Prefix Search Scheme in PSP Networks," $9^{th}$ International Workshop on the Web and Databases (WebDB 2006), Jun. 30, 2006, pp. 56-61 http://db.ucsd.edu/webdb2006/camera-ready/paginated/11-149.pdf.

Ramabhadran, et al. "Prefix Hash Tree: an Indexing Data Structure over Distributed Hash Tables," XP-002467877, Feb. 2004; 10 pages http://berkeley.intel-research.net/sylvia/pht.pdf.

Tisch, Steven, "Intelligence at the Edge," youtube, posted Apr. 23, 2010 http://www.youtube.com/watch?v=DoSPI3N5eTs.

Weatherspoon, Hakim, et al., "Erasure Coding vs. Replication: A Quantitative Comparison," In Proceedings of the First International Workshop on Peer-to-Peer Systems (IPTPS 2002), Mar. 7-8, 2002, 6 pages; http://citeseerx.ist.psu.edu/viewdoc/download?doi=10.1.1.16.5545&rep=rep1&type=pdf.

USPTO Jan. 2, 2015 Non-Final Office Action from U.S. Appl. No. 13/417,827.

\* cited by examiner

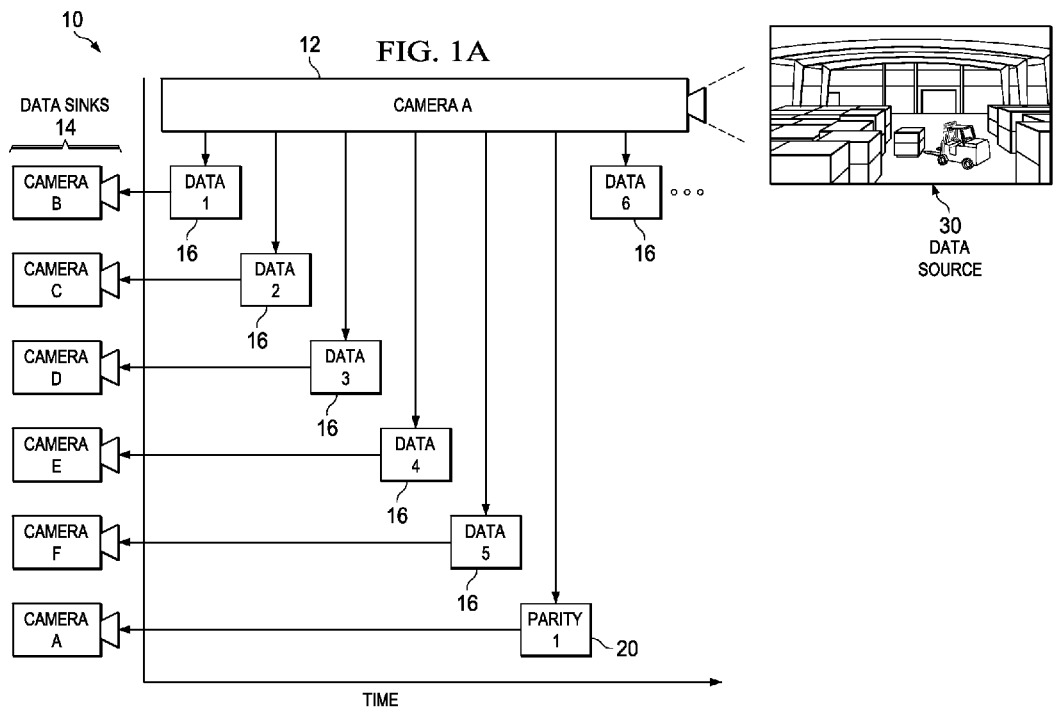

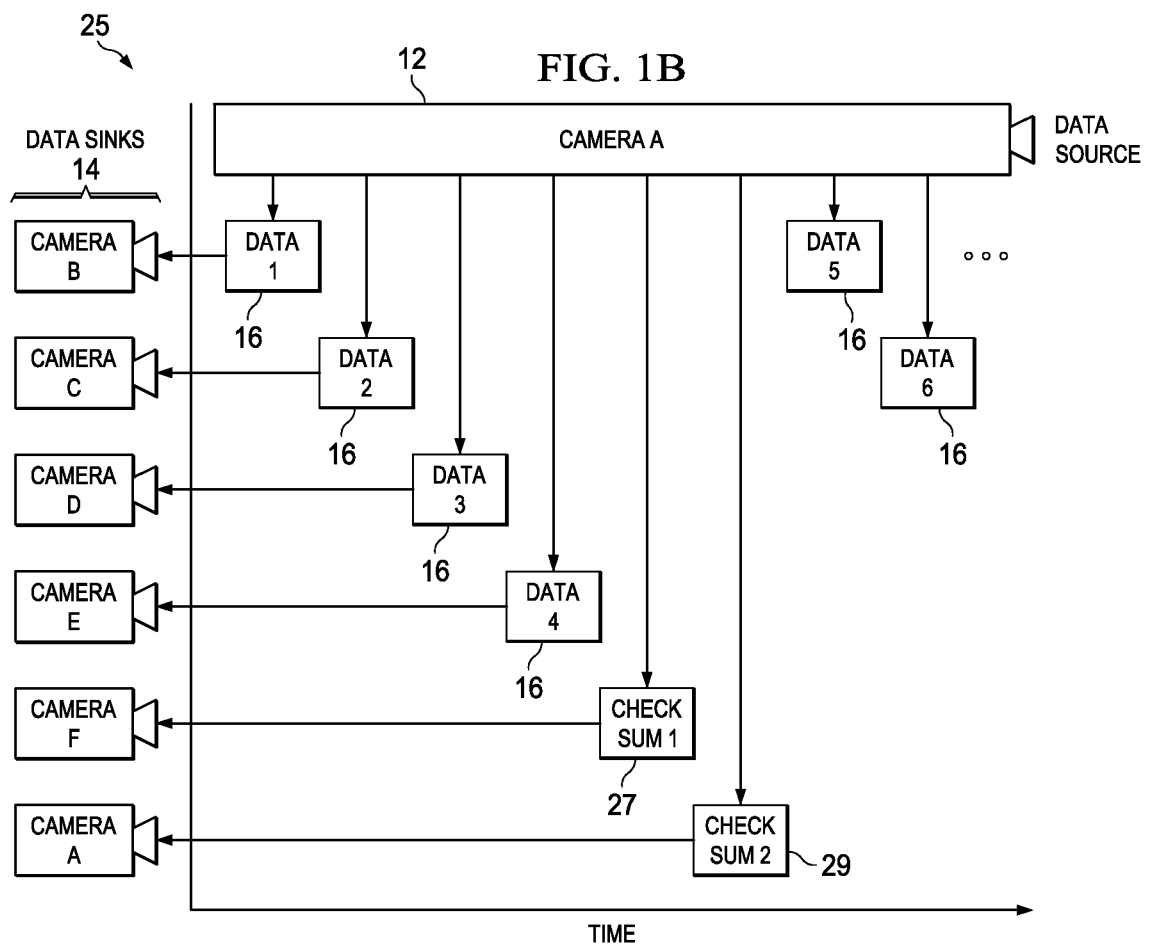

SYSTEM AND METHOD FOR VIDEO RECORDING AND RETENTION IN A NETWORK

TECHNICAL FIELD

This disclosure relates in general to the field of video surveillance, and more particularly, to a system and a method for video recording and retention in a network.

BACKGROUND

Video surveillance has grown in prominence in recent years. Security is a top priority for many organizations and governments. To help create a safe and secure environment, security personnel develop plans, train staff, and implement systems such as surveillance cameras, access controls, and radio systems. Traditionally, video/audio data from surveillance cameras is stored on a recorder (e.g., a network video recorder (NVR)/a digital video recorder (DVR)). Alternatively, if the data can be recorded to an on-board storage in the camera, there would be a cost savings and an operational simplification due to a simpler deployment. However, few deployments utilize on-board storage for recordings, as surveillance cameras are frequently lost, stolen, destroyed, or otherwise malfunction. If these events occur, then the internal data of these cameras is jeopardized, which could create a security breach to be addressed by security personnel, network administrators, etc.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1A is a simplified block diagram illustrating an example configuration of a video recording and retention system in accordance with one embodiment of this disclosure;

FIG. 1B is a simplified block diagram illustrating another example configuration of a video recording and retention system in accordance with one embodiment of this disclosure;

DETAILED DESCRIPTION OF EXAMPLE EMBODIMENTS

Overview

Figure 2:
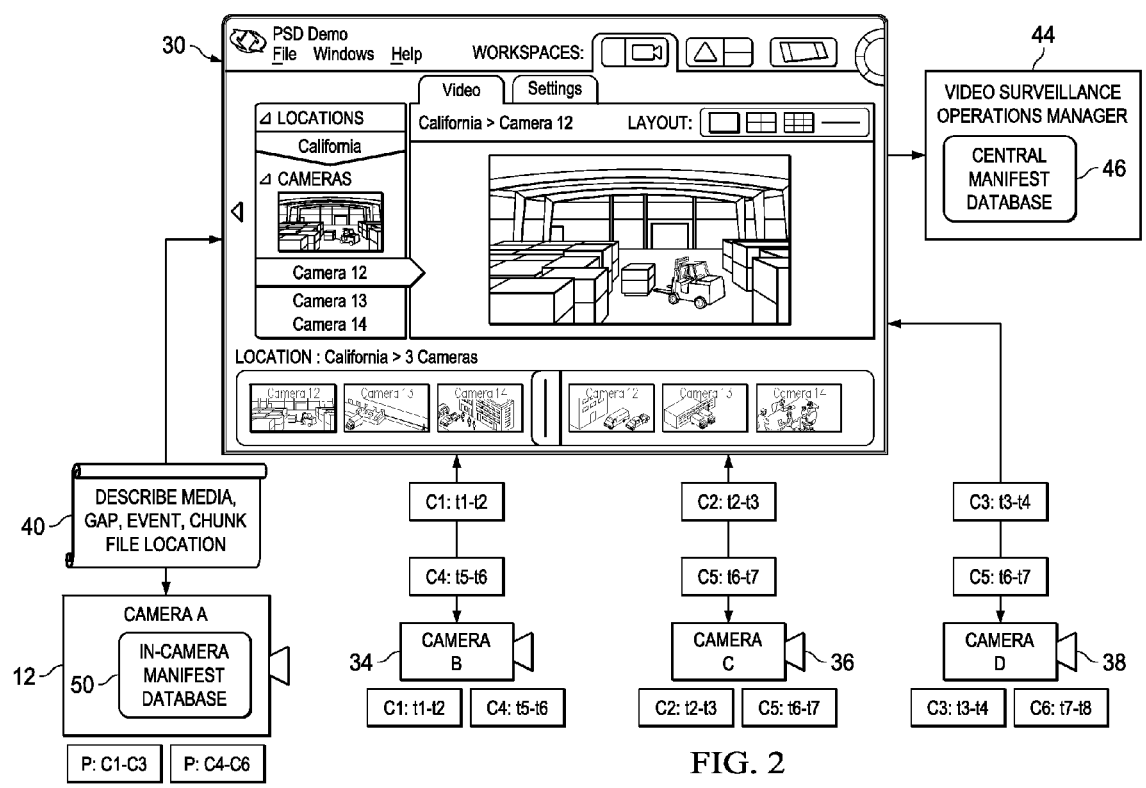
FIG. 2 is a simplified block diagram illustrating potential details that may be associated with the video recording and retention system.

A method is provided in one example embodiment and includes receiving a video frame from an encoder associated with a first camera that is coupled to a network; appending the video frame to a data block; associating a parity block to the video frame; evaluating whether the data block is full; and communicating the data block to a second camera in the network. Note that the terms 'appending' and 'associating' are broad in such contexts and include any type of processing that can be performed for the video frame and/or the data block.

In other embodiments, the method can include receiving additional video frames from the encoder; appending the additional video frames to a plurality of data blocks; and aligning particular sizes of the plurality of data blocks to a plurality of corresponding disk write sizes. In still yet other implementations, the method can include determining whether the parity block is full, and writing the parity block to persistent storage. In addition, if the data block is full, then the data block can be marked as dirty using metadata. In other example configurations, the method can include providing metadata for a plurality of data blocks; and storing the plurality of data blocks based on the metadata.

In specific examples, associating the parity block to the video frame can include performing an XOR operation with the data block and the video frame. The data block can include one or more groups of pictures (GOPs) that begin with an I-frame. In certain scenarios, a local data block copy remains in a dirty state until an explicit disk write transaction acknowledgment is received from a different camera coupled to the network. Primary and secondary video streams for a given time range can be stored in a same location in the network. Additionally, chunks of video data that overlap with an event window can be marked, check-summed, and retained in a database.

In the context of retrieving requested content, example method can include receiving a request for particular video content; accessing a manifest database to identify a location associated with the video content; and retrieving at least a portion of the video content from the location. In addition, certain example scenarios can include coordinating communications associated with an event delivery for the first camera in order to manage at least one recording and retention policy for the first camera.

Example Embodiments

Turning to FIG. 1A, FIG. 1A is a simplified block diagram of an example configuration of a video recording and retention system 10 in accordance with an embodiment of the present disclosure. Video recording and retention system 10 may include a camera 12 (labeled 'camera A') and a plurality of data sinks 14 (labeled as cameras B-F). Note that cameras B-F can distribute their data and function in a fashion similar to that of camera A, as detailed below. Camera 12 is representative of the data source in this particular example in which an area 30 (illustrated as a portion of a warehouse) is being monitored for security reasons. Also provided in FIG. 1A are multiple data blocks 16 (labeled as D1-D5) and a parity block 20 (labeled as P1). Data blocks 16 can include one or more groups of pictures (GOPs) and, further, be disk write size-aligned (e.g., for sizes 16 MB, 32 MB, 48 MB, 64 MB, etc.). This can allow data blocks 16 to be chunked for hypertext transfer protocol (HTTP) adaptive streaming in certain implementations of the present disclosure.

Video can be recorded at any level in the architecture of FIG. 1A. For example, video can be recorded on the camera itself, on the media server on the edge of the network, on a centralized media server cluster, any location within a cloud, etc. Similarly, when the video is received, it can be stored in the camera itself, a central location, a suitable database, etc. Each camera of the architecture can support local recording, encryption, single-stream based data redundancy, or any other suitable features that may be particular to a certain entity, or type of surveillance. In regards to management, the architecture of the present disclosure can offer a unified video lifecycle including configuration, fault management, audit, performance management, access control, streaming to various clients, searching, analytics data mining, backup, grooming, thinning, smart summarization, etc.

Note that FIG. 1A is a logical representation of video recording and retention system 10 that is independent of the underlying network infrastructure. Each of the elements of FIG. 1A may couple to one another through simple interfaces, or through any other suitable connection (wired or wireless), which provides a viable pathway for network communications. Additionally, any one or more of these elements of FIG. 1A may be combined or removed from the architecture based on particular configuration needs. Video recording and retention system 10 may include a configuration capable of transmission control protocol/Internet protocol (TCP/IP) communications for the transmission or reception of packets in a network flow. Video recording and retention system 10 may also operate in conjunction with a user datagram protocol/IP (UDP/IP), Fibre Channel over Ethernet (FCoE), or any other suitable protocol where appropriate and based on particular needs.

For purposes of illustrating certain example embodiments of video recording and retention system 10, it is important to understand certain activities and communications occurring within such a network surveillance system. Contextual information is provided below to offer an overview of some challenges of managing resources in a video surveillance network. Such information is offered earnestly and for teaching purposes only and, therefore, should not be construed in any way to limit the broad applications of the present disclosure.

Currently, in the video surveillance industry, many entities support recording and retaining video on the endpoints themselves. Hence, the storage of captured video data is typically occurring at an IP camera. On-camera video recording and retention has the potential to significantly simplify deployment and provisioning. In addition, certain new business models (e.g., 'Security as a Service') can benefit from on-camera video recording: coupled with storage and management in a cloud environment.

In spite of these advantages offered by camera-based video recording frameworks, such systems are not without their challenges. For example, in the context of storage activities, many entities have expressed concern over the camera being stolen (at which time, the video data is vulnerable to being seen by an authorized personnel), or the camera becoming dysfunctional (in which case, the video data is difficult to retrieve), etc. Thus, a stolen, failed, or vandalized camera can mean that video recording in the camera is lost forever. Hence, because current IP camera designs are self-contained, if the camera is compromised, then the data is in jeopardy of being unrecoverable.

In addition, cameras generally use laptop hard drives, where such hard drives have an annual failure rate (AFR) of 1.5%. Replacing 1.5% of the deployed cameras annually could add a significant maintenance cost to these systems. Logistically, it should also be noted that less than 1% of captured surveillance video is ever watched. Additionally, there is certain server hardware and additional management infrastructure that is superfluous and, therefore, should be eliminated. In addition, video storage should be scaled automatically, as cameras are added to the system. Moreover, any overreliance on network viability should be avoided (e.g., compared to certain deployments that use a wide area network (WAN) link to record video in a central site).

Another issue that surfaces in video surveillance contexts is associated with the limited streaming capacity on a given camera. The management of streaming video can present significant challenges in many of the contexts discussed herein. The nature of the camera is such that it represents an embedded device with limited resources and, as such, it cannot support multiple users (e.g., 10+ users) simultaneously, who seek to watch live video. Thus, cameras have limited central processing unit (CPU) power, where the cameras cannot support hundreds of clients connecting to it (e.g., during an emergency situation). Currently, media servers allow scaling the number of client connections with more robust CPU/memory. In addition, as endpoints are provisioned with more intelligence, managing many distributed entities becomes more difficult. Moreover, it is challenging to implement cross-domain policies (e.g., recording begins when a particular door opens in a warehouse). Separately, accommodations should be made to calculate parity on the fly (i.e., in real-time).

Certain embodiments of the present disclosure can address these issues (and potentially others) in providing a redundant array of cameras such that any potential failure/loss of a camera, would allow video to be rebuilt/reconstructed from the other cameras in the array. More specifically, the proposed scheme of video recording and retention system 10 provides redundancy and storage pooling in a redundant array of cameras (RAC) framework. At least in one generic sense, the storage efficiency of the proposed scheme is similar to that of RAID. However, unlike RAID, the proposed scheme deals gracefully with intermittent connection failures and, further, allows on-the-fly cluster size changes, as it operates at the application layer. In the proposed scheme, the source camera can chunk the streaming video data into video data blocks consisting of one or more GOPs, where the source camera can position prefixes in the data block with particular metadata, which describes the data block.

In operation, the architecture the present disclosure can segment and replay an infinite stream of video data. The architecture can also provide up-to-the-last frame reliability by working in conjunction with a real-time transport protocol (RTP) with potentially an "incremental" syndrome update. The architecture can further cover associated audio, as well as accounting for events. The architecture can also provide a viable storage distribution mechanism for N sources: each with a varying data rate, consuming N drives as a unified pool. For video playback, the client can control reverse play, speed scale, etc. Sufficient hints can be provided concerning the GOP sizes and the data rates can be streamed in order to engender suitable estimates by the client player.

In a particular implementation, secondary and primary streams for a given time range can be stored in the same location. In addition, audio and video streams for a given time range can be stored in the same location. In terms of event-based recording, chunks that overlap with an event window can be marked, check-summed, and retained. Unmarked chunks can be suitably discarded. An advanced database can be provisioned such that alerts can be readily pushed to any appropriate location. Events can be patched and updated in a central database and/or backed-up in real-time to one or more peer cameras.

In terms of advantages of certain embodiments of the present disclosure, it should be noted that, in the industry, camera-based video recording and retention is at its infancy. Camera-based video recording and retention has the potential to simplify deployment, configuration, and maintenance for these systems. Camera-based recording products that are currently sold lack support for redundancy, the ability to share the storage, and an effective management infrastructure. The present disclosure provides a scheme that addresses the core issues for wider adoption of camera-based recording and retention activities. This scheme can be carefully provisioned to suitably match with certain characteristics of streamed video and, further, offer optimal disk access matching for captured video.

More specifically, the data blocks captured by the architecture of the present disclosure can be sized to match one of the optimal disk access sizes. To be able to tolerate K failures in a cluster of size N, an appropriate code can be utilized by the source camera to produce K redundant blocks for every N-K data blocks. The data blocks and redundant blocks can be distributed to the cameras in the cluster (e.g., as they become available). The source camera's video data block copy could be in a dirty state until an explicit disk write transaction acknowledgment is received from the destination camera. A central database additionally tracks information pertaining to gaps, events, data block locations, etc. A local data block database entry would be in dirty state until the central database is updated.

FIG. 1B is a simplified block diagram illustrating an example configuration of a video recording and retention system 25 in accordance with one possible embodiment of the present disclosure. This particular example reflects a single source M+N case. More specifically, FIG. 1B illustrates a single stream parity (N+M) case with N=4 and M=2. The architecture of FIG. 1B includes infrastructure similar to that of FIG. 1A and, further, includes several checksum blocks 27 and 29 (labeled C1 and C2, respectively). Cameras B-F distribute their data similar to that of camera A.

It should be appreciated that while the ensuing descriptions focus on single parity (N+1) use cases, the present disclosure equally encompasses any type of N+M scheme having M parities, as shown in FIG. 1B. The single parity scenarios are detailed below for purposes of highlighting example possible implementations of the present disclosure. Other arrangements that involve the aforementioned N+M scheme (with M parities) are contemplated by the broad teachings of the present disclosure.

In regards to flash memory, as it relates to video recording and retention system 10, over the last 10 years, there has been 150% improvement (year-over-year) in MB per-dollar for flash memory. Provided this trend continue, in three years, ½ TB of flash memory would cost about $50. Separately, accuracy in finding security-related events continues to improve with advances in camera-based video analytics. With these projected technology improvements, in about three years, HD quality event-based video can be recorded and retained for 30 days in ½ TB of on-camera flash-based storage. Use of flash-based storage for on-camera recording would eliminate the reliability concerns associated with utilizing hard disks on cameras. However, flash-based storage would continue to cost more in comparison to hard disk-based storage. When higher priced flash memory is utilized for video storage, improving storage utilization (by sharing the storage across multiple cameras) would be critical. The present disclosure offers a scheme in which a cluster of cameras is able to share individual flash-based storage as a unified pool for recording and retaining video.

Turning to FIG. 2, FIG. 2 is a simplified block diagram illustrating additional details that may be associated with an internal structure of video recording and retention system 10. FIG. 2 includes a plurality of cameras 34, 36, and 38, which are labeled camera A, camera B, camera C, and camera D, respectively. FIG. 2 also includes a video surveillance operations manager (VSOM) 44, which includes a central manifest database 46. Also provisioned within FIG. 2 is an in-camera manifest database 50, which may be included within camera 12 (or in any other suitable location). Contents within the databases of the architecture may be replicated in part, in full, or simply updated periodically based on some administrator setting, manual provisioning, etc. In addition, certain information from manifest database 50 and/or central manifest database 46 is provided in an information block 40, which can include items such as a media description, a gap in time, event data, a chunked file location, etc. Other information could readily be provisioned in central manifest database 46.

In operation, camera A is configured to generate blocks C1, C2, etc., (as illustrated), where a parity block is generated for that video object. A block is simply one or more frames, where the block can include any suitable video data. The parity can be maintained in the camera, and the individual segments can be shipped to additional camera destinations (e.g., camera B, camera C, camera D in the implementation of FIG. 2). In order to retrieve video information at a subsequent time, the in-camera manifest database or the central manifest database can be accessed to identify the appropriate video location. In this case, the C1 segment would be found in camera B, the C2 segment would be found in camera C, and the C3 segment would be found in camera D.

Embodiments of video recording and retention system 10 can tolerate K failures in a cluster of N cameras: providing storage efficiency (N−K)/N similar to a RAID-based system, but without the complexity associated with RAID-based systems. A separate methodology can be used to playback video from this cluster and, further, recover video when failures occur. In certain implementations, the cross camera traffic needed for implementing the RAC algorithm can remain on the local switch and, further, does not pollute the network. Additionally, certain embodiments can employ the use of stateless on-demand proxies for scaling live video performances.

In certain cases, the architecture of the present disclosure can use media servers as an on-demand media proxy, where only a small number of media servers (without storage) would be used. Furthermore, certain embodiments of the present disclosure effectively address hypothetical concerns relating to cameras in a network with a non-routed IP address. These cameras are typically not accessible from the Internet, but are accommodated by the present disclosure. In addition, the present disclosure can use management software to coordinate (e.g., wire-up) event delivery in order to run cross-domain policies in the camera (or in a gateway, or within a media server, etc.).

In operation, requests to watch live video can be directed to the particular camera. VSOM 44 is configured to track of the number of connections to any given camera. If the number of connections to a camera exceeds a certain number (e.g., a defined threshold), new requests would be sent to an on-demand RTP/RTSP proxy in the network. This proxy follows the same token-based security model, and access control can be coordinated via VSOM 44. Features of the present disclosure can manage the encryption keys used for encrypting media at any location in the network. The cameras can register to the network on boot-up. In certain example implementations, an extension to the Medianet scheme can be provided that enables the network to supply encryption keys to the cameras. Medianet-enabled cameras in turn use these keys to encrypt video data onto disks.

In certain cases, these keys would not be persisted (be kept only in memory) by the cameras. On the occasion when a camera cannot reach the Medianet component in the network, it can generate the encryption keys locally and use them to encrypt the video on the disk. When a connection to the network is restored, these keys are sent to the Medianet component and then deleted from the camera. A heuristic algorithm for identifying near optimal camera clusters can also be provided. In addition, schemes of the present disclosure can algorithmically identify clusters such that the minimum distance between any two cameras in a cluster is maximized. Note that certain entities may request for a latest frame to be provided and for safer storage. This can be accommodated by the present disclosure by streaming certain video to the media server and to an off-site location. In essence, the RAC scheme can be extended to an update mode to account for these issues, as discussed below.

In operation of an example flow, the architecture of FIG. 2 can operate as follows. Camera A can chunk the video data into data blocks consisting of one or more GOPs (e.g., beginning with an I-Frame). Subsequently, metadata can be added to the data blocks. Next, the data block size is aligned to optimal disk write sizes. The local data block copy is in a dirty state until an explicit disk write transaction ACK is received from the data sink. The central database additionally tracks the location of the data block (i.e., which data block resides at which particular location). The local data block database entry remains in a dirty state until a central database is updated. A running checksum block is kept at the source.

Note that this configuration offers a simple algorithm to implement in an embedded system. Moreover, it is straightforward to change cluster size/schemes without interrupting video recording. There is an effective rebuilding mechanism for video data and databases are being fully supported. The rebuild operations can be performed on an external server or on a camera. The databases can be rebuilt from video data chunks. At replacement, dirty data blocks can be spilled from the source at a lower priority (lower system and network priority). The actual rebuilds can be throttled similar to RAID in certain implementations of the present disclosure.

Note that a smart client can be used to play from multiple sources. The modified client functions of the present disclosure are similar to an adaptive HTTP streaming client with the following differences: 1) a rest interface to a manifest database, instead of a manifest file; and 2) URIs refer to multiple end hosts instead of a single host. In actuality, the client can switch between S1/S2 chunk files similar to HTTP adaptive streaming until SVC is available.

In terms of the database structure, a scalable/cacheable database with a defined rest interface can replace the manifest file. The databases can describe available media, provide gap information, event information, time to video-data location mapping, etc. Note that traditional CDN/HTTP caching (with HTTP cache control) can be used for scaling. The media server (e.g., VSOM 44) can serve as an HTTP caching/ streaming-proxy in addition to being a live RTP/RTSP proxy. In addition, the system can optionally provide an HTTP to RTP/RTSP proxy for RTP/RTSP clients.

Figure 3:
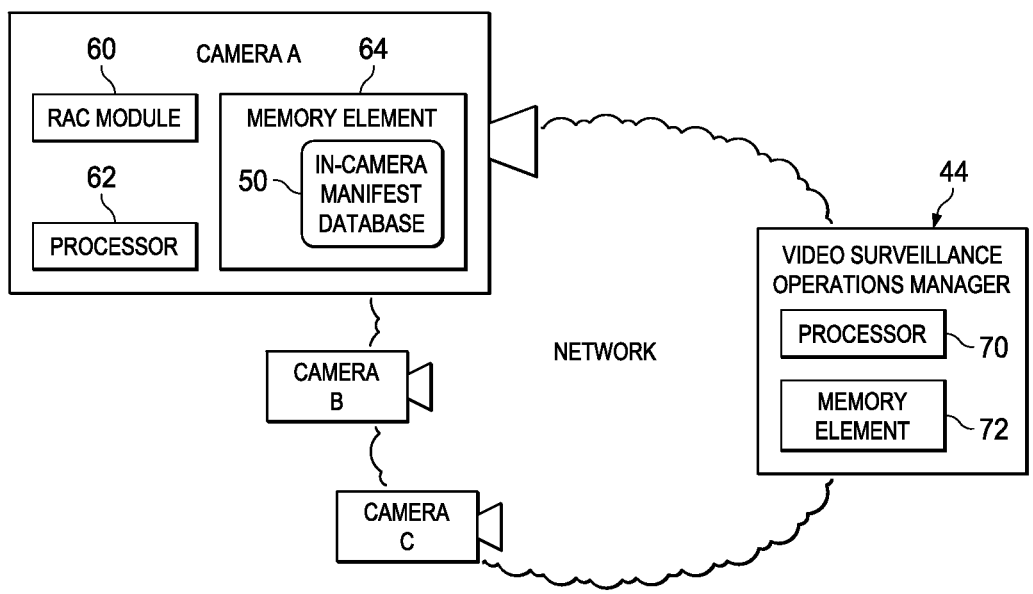
FIG. 3 is a simplified block diagram illustrating details that may be associated with internal components of the video recording and retention system.

FIG. 3 is a simplified block diagram illustrating one potential internal structure associated with a particular camera. In this particular instance, camera A includes a RAC module 60, a processor 62, and a memory element 64, which further includes an instance of an in-camera manifest database 50. Note that all of the other cameras in the system can include similar infrastructure such that the management of video being captured is consistent. In addition, FIG. 3 illustrates VSOM 44, which may include a processor 70 and a memory element 72. In operation, VSOM 44 can support HD clip upload, SD streaming, zero video loss, etc. Additionally, VSOM 44 can act as an RTP/RTSP dynamic proxy for live video, HTTP cache/proxy for recorded video, include video on camera in its backup policies, etc.

Figure 4A:
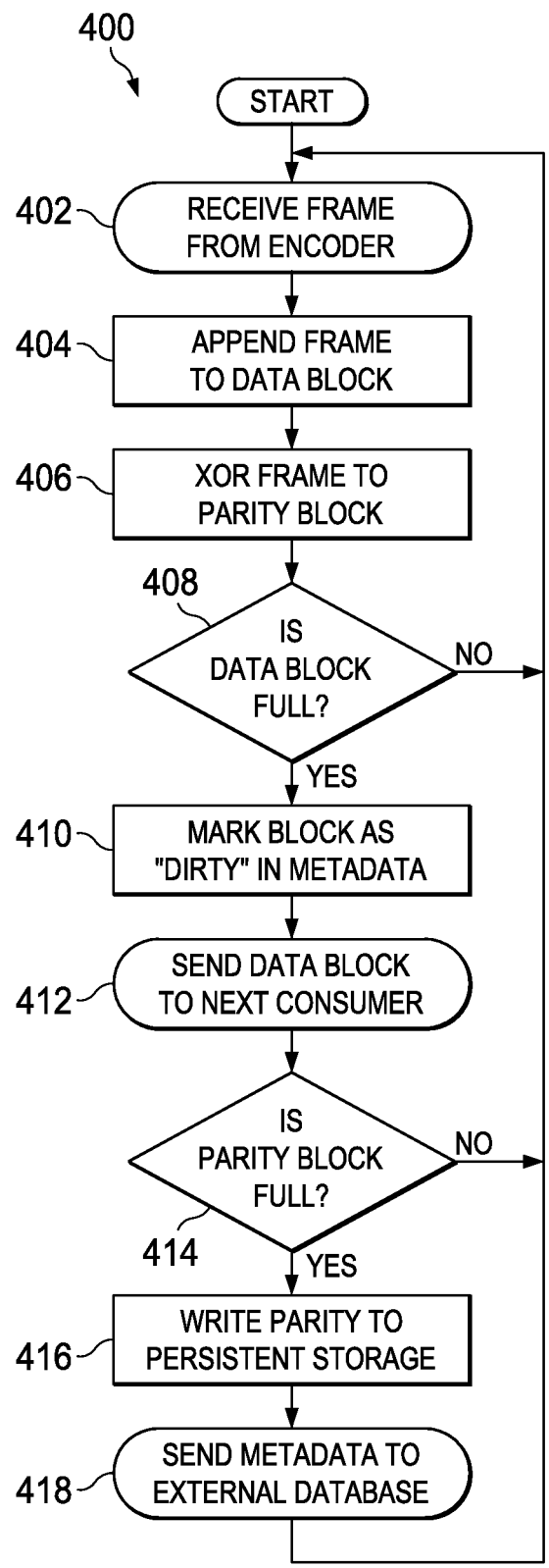
FIGS. 4A-4C are simplified flow diagrams illustrating potential operations that may be associated with example embodiments of the video recording and system.
Figure 4B:
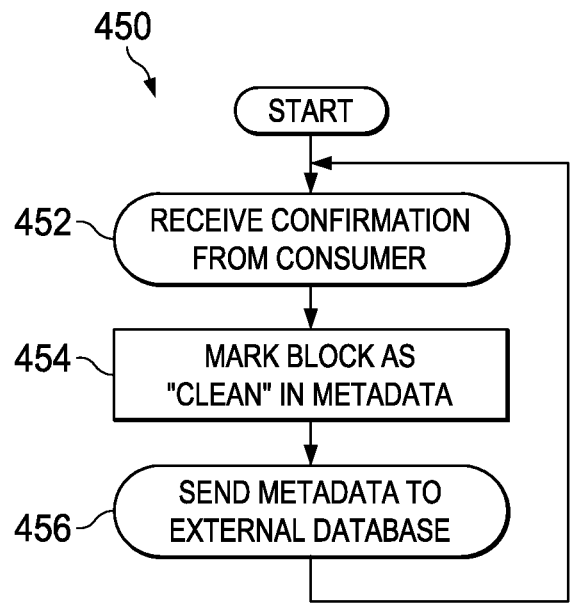
Figure 4C:
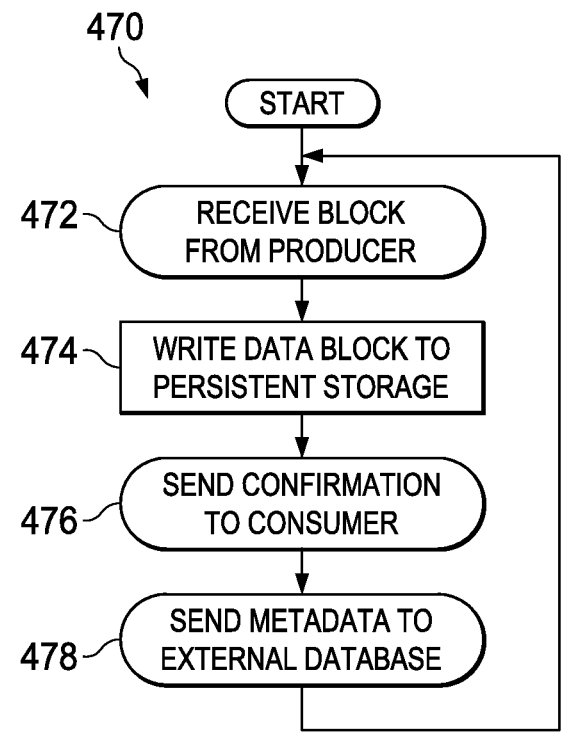

Turning to some of the potential flows of the system, FIGS. 4A-4C are simplified flow diagrams illustrating potential operations that may be associated with example embodiments of a block-based update scheme. In general terms, the flow diagram of FIG. 4A deals with operations at the block layer. More specifically, FIG. 4A is a simplified flow diagram 400 illustrating a main thread associated with a producer of video data. In this flow, when the whole block is ready, it is written and the parity is provided for the producer. In contrast, for the flow diagram of FIG. 4B, the video segments (i.e. the updates) are being provided to the consumers in real-time, as further discussed below.

The particular flow of FIG. 4A may begin at 402, where a frame is received from an encoder. The encoder may be part of the camera, or provided within any other appropriate component. At 404, the frame can be appended to the data block. At 406, the frame and the parity block are suitably related (e.g., XOR-ed together). At 408, a check is made to determine whether the data block is full. If the block is full, then the block is marked as 'dirty' using suitable metadata (shown at 410). At 412, the data block can be sent to a next consumer, or to any other suitable location in the network. At 414, a check is made to determine whether the parity block is full. If the parity block is full, then the parity block is written to persistent storage at 416. At 418, the metadata is sent to an external database for storage, management, organization, etc.

FIG. 4B is a simplified flow diagram 450 associated with a producer involved in a message thread. At 452, a confirmation is received from a consumer of the video. At 454, a block is marked as 'clean' using metadata. At 456, the metadata can be sent to an external database for updating. FIG. 4C is a simplified flow diagram 470 associated with a consumer of video data being collected by the system of the present disclosure. This particular flow may begin at 472 when a block is received from a producer. At 474, the data block is written to a persistent storage. At 476, a confirmation is sent to the consumer. At 478, metadata is sent to an external database for updating information associated with this particular video segment.

Figure 4D:
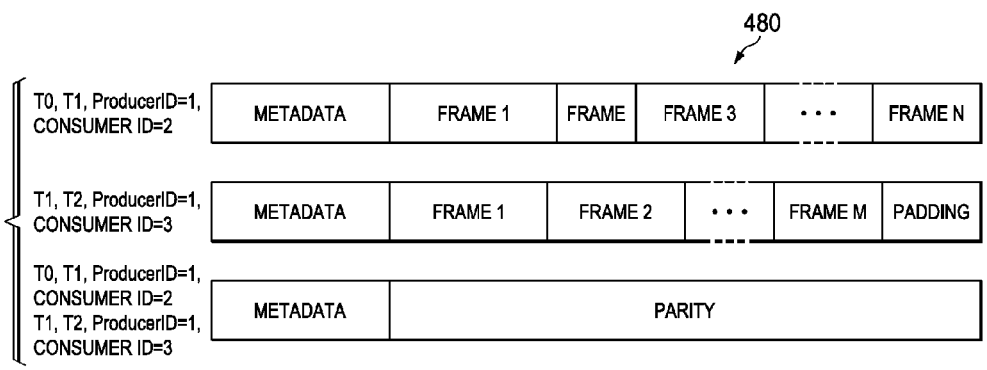
FIG. 4D is a simplified block diagram illustrating an example frame chronology associated with the video recording and retention system.

FIG. 4D is a simplified block diagram illustrating an example frame chronology 480 associated with the present disclosure. There are various time intervals being provided in this particular illustration. For example, at T0, T1, and for Producer ID=1, Consumer ID=2, video data is effectively relayed to other cameras within the architecture. Metadata can be used to mark each of the frames. Note that in a block mode, there can be timeouts before a block is fully filled such that a suitable padding may be provided with extra data and then the block can be pushed to a sink destination. Hence, FIG. 4D is illustrating certain padding being added to the frames. In addition, the parity block is also being illustrated in this particular scenario.

Figure 5A:
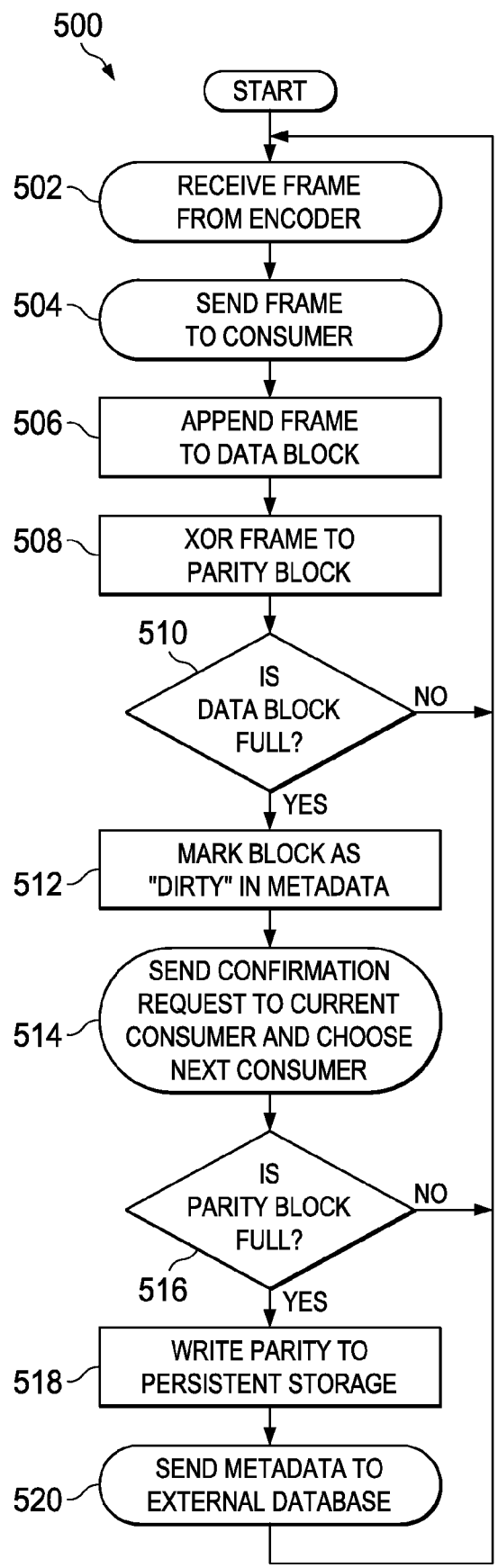
FIGS. 5A-5C are simplified flow diagrams illustrating potential operations that may be associated with example embodiments of the video recording and system.
Figure 5B:
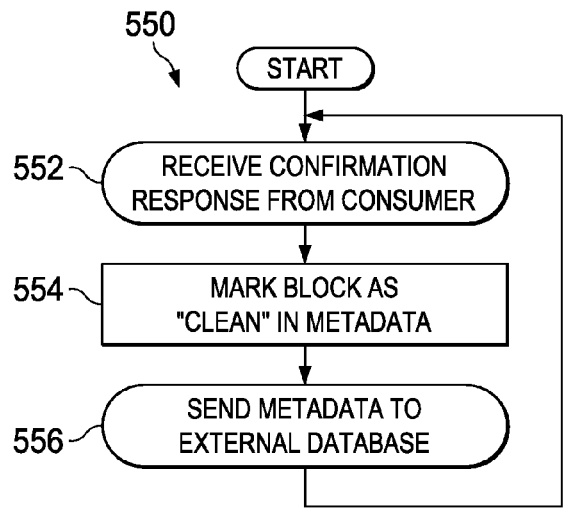
Figure 5C:
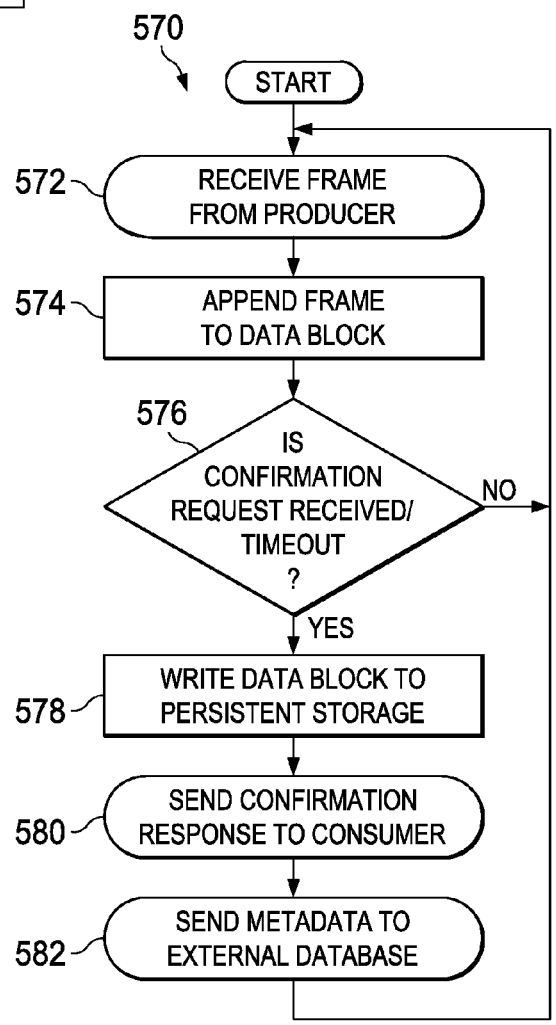

Turning to FIGS. 5A-5C, FIGS. 5A-5C are simplified flow diagrams illustrating potential operations that may be associated with example activities in which a frame-based update scheme is being implemented. In these flows, a frame-based scheme is proposed in which there is no delay in protecting the latest frame to propagate in the network. In such a case, the information can be collected and distributed in shorter intervals, as the frames become available. In the previous case outlined herein, it could take a significant time interval (e.g., 30 seconds) in order to gather information for the video block.

Within that 30-second window, if the producer component were to malfunction/die, then the last 30 seconds would be lost. This scenario can be avoided by employing the operations outlined in FIGS. 5A-5C. For example, the minimal delay associated with capturing the video data could be, for example, in the order of milliseconds (30 ms. or shorter). Hence, the update to the consumers can be happening on a near real-time basis (i.e., frame-by-frame, as the frames are becoming available).

More specifically, FIG. 5A is a simplified flow diagram 500 illustrating a main thread associated with a producer of video. This particular flow may begin at 502, where a frame is received from any suitable encoding source. At 504, a frame is sent to a consumer. At 506, the frame is appended to a data block. At 508, the frame is suitably related to the parity block using any appropriate logic (e.g., an XOR operation). At 510, a check is made to determine whether the data block is full. If the block is full, then at 512, the block is marked as dirty using metadata. A confirmation request is sent to a current consumer and a next consumer is chosen at 514. At 516, a check is made to determine whether the parity block is full. If the parity block is full, then at 518, the parity block is written to a persistent storage. Metadata is sent at 520 to any suitable storage area (e.g., an external database).

FIG. 5B is a simplified flow diagram 550 associated with a message thread for a producer. In this particular example, the flow may begin at 552, where a confirmation response is received from the consumer. At 554, the block is marked as clean in metadata. In 556, the metadata is sent to an external database. Note that in certain algorithms of the present disclosure, a confirmation request may be suitably coupled (e.g., piggybacked) to the last frame of the block to avoid certain undesired conditions.

FIG. 5C is a simplified flow diagram 570 associated with a consumer of video. This particular flow may begin at 572, where a frame is received from a producer of video. At 574, the frame is appended to a data block. A determination is made at 576 as to whether the confirmation request is received/timed-out. If yes, then the data block is written to persistent storage at 578. At 580, a confirmation response is sent to the consumer. At 582, metadata is sent to the external database.

Note that the nodes of video recording and retention system 10, including camera 12 and VSOM 44, are representative of any suitable network element that can exchange video information. This network element terminology is meant to encompass network appliances, cameras, computers, servers, routers, switches, gateways, bridges, loadbalancers, modules, or any other device, component, element, or object operable to exchange information in a network environment. The nodes can also be representative of any suitable endpoints, which can have various potential applications. The network elements are configured to receive and/or capture data for subsequently propagating video communications over the network.

In a particular implementation, the network elements are representative of IP cameras that can be used for virtually any purpose (e.g., surveillance, advertisements, security, logging operations, maintenance activities, etc.). The term 'IP camera' is inclusive of analog cameras, and any other suitable endpoint device that could similarly be used in activities relating to capturing video. For example, the broad term 'camera' is inclusive of (or associated with) devices used to capture video such as any type of a personal digital assistant (PDA), a laptop or electronic notebook, a cellular telephone, an iPhone, an IP phone, iPad, a Telepresence system, a Skype mechanism, or any other device, component, element, or object capable of initiating or facilitating audio, video, media, or data exchanges within a network environment.

In their configurations, the network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with the network elements of video recording and retention system 10, each of the cameras, VSOM 44, and other nodes can include memory elements for storing information to be used in the operations outlined herein. Each of the cameras, VSOM 44, and other nodes may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory elements discussed herein should be construed as being encompassed within the broad term "memory element" or "memory." Information being used, tracked, sent, or received by camera 12, VSOM 44, and other network elements could be provided in any database, manifest, register, queue, table, cache, control list, or other storage structure, all of which can be referenced at any suitable timeframe. Any such storage options may be included within the broad term "memory element" or "memory" as used herein.

In certain example implementations, the video recording and retention functions outlined herein may be implemented by logic encoded in one or more non-transitory tangible media (e.g., embedded logic provided in an ASIC, digital signal processor (DSP) instructions, software (potentially inclusive of object code and source code) to be executed by a processor, or other similar machine, etc.). In some of these instances, memory elements can store data used for the operations described herein. This includes the memory elements being able to store software, logic, code, or processor instructions that are executed to carry out the activities described herein.

In one example implementation, camera 12, VSOM 44, and/or other nodes may include software modules (e.g. RAC module 60) to achieve, or to foster, the video recording and retention operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Additionally, each of the cameras, VSOM 44, and/or other nodes may include one or more processors (or virtual processors) that can execute software or an algorithm to perform activities as discussed herein. A processor or virtual processor can execute any type of instructions associated with the data to achieve the operations detailed herein. In one example, a processor (such as shown in FIG. 3) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term "processor."

In the examples provided above, as well as numerous other potential examples, interaction may be described in terms of two, three, or four network elements. However, the number of network elements has been limited for purposes of clarity and example only. In certain cases, it may be easier to describe one or more of the functionalities of a given set of operations by only referencing a limited number of network elements. It should be appreciated that video recording and retention system 10 is readily scalable and can accommodate a large number of components, as well as more complicated/sophisticated arrangements and configurations. Accordingly, the examples provided should not limit the scope or inhibit the broad teachings of video recording and retention system 10 as potentially applied to a myriad of other architectures. Additionally, although described with reference to particular scenarios, where a particular module is provided within a network element, these modules can be provided externally, or consolidated and/or combined in any suitable fashion. In certain instances, such modules may be provided in a single proprietary unit.

It is also important to note that the appended diagrams illustrate only some of the possible scenarios and patterns that may be executed by, or within, video recording and retention system 10. For example, some operations may be deleted or removed where appropriate, or these operations may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by video recording and retention system 10 in that any suitable arrangements, chronologies, configurations, and timing mechanisms may be provided without departing from the teachings provided herein.

Additionally, although the present disclosure has been described in detail with reference to particular embodiments, it should be understood that various other changes, substitutions, and alterations may be made hereto without departing from the spirit and scope of the present disclosure. While the previous discussions have focused on certain content applications, other architectures and protocols could readily adopt the teachings of the present disclosure. For example, the present disclosure can be used in virtually any surveillance applications (e.g., building security, digital advertising (e.g., involving proof-of-play), casino environments, sports entertainment venues, concerts, etc.). Furthermore, the architecture of the present disclosure could be equally applicable to any media server applications, as well as video conferencing scenarios in which communications occur in real-time (e.g., on-demand), where speech and video data can effectively be captured after failover scenarios.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a video frame from an encoder associated with a first camera that is coupled to a network;
   appending the video frame to a data block;
   associating a parity block to the video frame;
   evaluating whether the data block is full;
   if the data block is full, marking the data block as dirty using metadata; and
   communicating the data block to a second camera in the network.

2. The method of claim 1, further comprising:
   receiving additional video frames from the encoder;
   appending the additional video frames to a plurality of data blocks; and
   aligning particular sizes of the plurality of data blocks to a plurality of corresponding disk write sizes.

3. The method of claim 1, further comprising:
   determining whether the parity block is full; and
   writing the parity block to persistent storage.

4. The method of claim 1, further comprising:
   providing metadata for a plurality of data blocks; and
   storing the plurality of data blocks based on the metadata.

5. The method of claim 1, wherein associating the parity block to the video frame includes performing an XOR operation with the data block and the video frame.

6. The method of claim 1, wherein the data block includes one or more groups of pictures (GOPs) that begin with an I-frame.

7. The method of claim 1, wherein a local data block copy remains in a dirty state until an explicit disk write transaction acknowledgment is received from a different camera coupled to the network.

8. The method of claim 1, wherein primary and secondary video streams for a given time range are stored in a same location in the network.

9. The method of claim 1, wherein chunks of video data that overlap with an event window are marked, checksummed, and retained in a database.

10. The method of claim 1, further comprising:
    receiving a request for particular video content;
    accessing a manifest database to identify a location associated with the video content; and
    retrieving at least a portion of the video content from the location.

11. The method of claim 1, further comprising:
    coordinating communications associated with an event delivery for the first camera in order to manage at least one recording and retention policy for the first camera.

12. Logic encoded in one or more non-transitory media that includes code for execution and when executed by one or more processors is operable to perform operations comprising:
    receiving a video frame from an encoder associated with a first camera that is coupled to a network;

appending the video frame to a data block;
associating a parity block to the video frame;
evaluating whether the data block is full;
if the data block is full, marking the data block as dirty using metadata; and
communicating the data block to a second camera in the network.

13. The logic of claim 12, the operations further comprising:
receiving additional video frames from the encoder;
appending the additional video frames to a plurality of data blocks; and
aligning particular sizes of the plurality of data blocks to a plurality of corresponding disk write sizes.

14. The logic of claim 12, the operations further comprising:
determining whether the parity block is full; and
writing the parity block to persistent storage.

15. The logic of claim 12, the operations further comprising:
providing metadata for a plurality of data blocks; and
storing the plurality of data blocks based on the metadata.

16. The logic of claim 12, the operations further comprising:
receiving a request for particular video content;
accessing a manifest database to identify a location associated with the video content; and
retrieving at least a portion of the video content from the location.

17. The logic of claim 12, the operations further comprising:
coordinating communications associated with an event delivery for the first camera in order to manage at least one recording and retention policy for the first camera.

18. An apparatus, comprising:
a processor;
a redundant array of cameras (RAC) module; and
a memory storing instructions and coupled to the processor, wherein the processor is executes the instructions for causing the apparatus to:
receive a video frame from an encoder;
append the video frame to a data block;
associate a parity block to the video frame;
evaluate whether the data block is full;
if the data block is full, marking the data block as dirty using metadata; and
communicate the data block to a camera in the network.

19. The apparatus of claim 18, further comprising:
a manifest database coupled to the apparatus for storing a plurality of data blocks based on metadata.

* * * * *